US008933169B2

(12) United States Patent
Schattka et al.

(10) Patent No.: US 8,933,169 B2
(45) Date of Patent: Jan. 13, 2015

(54) LOW WATER-ABSORPTION PLASTISOL POLYMERS

(75) Inventors: Jan Hendrik Schattka, Hanau (DE); Gerd Loehden, Hanau (DE)

(73) Assignee: Kaneka Belguim N.V., Westerlo-Oevel (BE)

( * ) Notice: Subject to any disclaimer, the term of this patent is extended or adjusted under 35 U.S.C. 154(b) by 0 days.

(21) Appl. No.: 11/569,699

(22) PCT Filed: Jul. 12, 2005

(86) PCT No.: PCT/EP2005/007513
§ 371 (c)(1),
(2), (4) Date: Nov. 28, 2006

(87) PCT Pub. No.: WO2006/010465
PCT Pub. Date: Feb. 2, 2006

(65) Prior Publication Data
US 2007/0259987 A1  Nov. 8, 2007

(30) Foreign Application Priority Data

Jul. 23, 2004  (DE) .......................... 10 2004 035 937

(51) Int. Cl.
| C08K 5/00 | (2006.01) |
|---|---|
| C08K 5/09 | (2006.01) |
| C08K 5/10 | (2006.01) |
| C08L 39/00 | (2006.01) |
| C08L 31/02 | (2006.01) |
| C08L 33/00 | (2006.01) |
| C08L 33/06 | (2006.01) |
| C08L 33/08 | (2006.01) |
| C08L 33/10 | (2006.01) |
| C08F 2/22 | (2006.01) |
| C08L 35/02 | (2006.01) |
| C08F 265/06 | (2006.01) |

(52) U.S. Cl.
CPC .................................. C08F 265/06 (2013.01)
USPC .......... 524/827; 524/284; 524/306; 524/314; 524/315; 524/543; 524/555; 524/556; 524/560; 524/804; 524/832

(58) Field of Classification Search
USPC ......... 524/556, 560, 800, 801, 804, 543, 284, 524/306, 315, 314, 555, 827, 832
See application file for complete search history.

(56) References Cited

U.S. PATENT DOCUMENTS

| 3,970,725 | A | | 7/1976 | Tugukuni et al. |
|---|---|---|---|---|
| 4,199,486 | A | * | 4/1980 | Boessler et al. ............... 523/201 |
| 5,055,504 | A | * | 10/1991 | Mahil et al. ...................... 524/48 |
| 5,539,073 | A | | 7/1996 | Taylor et al. |
| 5,794,403 | A | | 8/1998 | Oberlander et al. |
| 6,040,385 | A | * | 3/2000 | Van De Berg et al. ........ 525/205 |
| 6,172,135 | B1 | * | 1/2001 | Fraser et al. ................... 523/201 |
| 6,433,048 | B2 | * | 8/2002 | Kasai ............................. 524/244 |
| 6,498,209 | B1 | | 12/2002 | Loehden et al. |
| 6,566,441 | B1 | | 5/2003 | Lohden et al. |
| 6,809,163 | B2 | | 10/2004 | Schultes et al. |
| 6,989,409 | B2 | | 1/2006 | Loehden et al. |
| 7,049,355 | B2 | | 5/2006 | Quis et al. |
| 2004/0116567 | A1 | | 6/2004 | Schmitt et al. |
| 2007/0068088 | A1 | | 3/2007 | Einfeldt et al. |
| 2007/0117948 | A1 | | 5/2007 | Loehden et al. |
| 2007/0193156 | A1 | | 8/2007 | Kautz et al. |
| 2007/0193159 | A1 | | 8/2007 | Schattka et al. |
| 2007/0193478 | A1 | | 8/2007 | Schattka et al. |
| 2007/0196655 | A1 | | 8/2007 | Schattka et al. |
| 2007/0197671 | A1 | | 8/2007 | Schattka et al. |
| 2007/0197689 | A1 | | 8/2007 | Kautz et al. |
| 2007/0197690 | A1 | | 8/2007 | Schattka et al. |
| 2007/0197691 | A1 | | 8/2007 | Kautz et al. |
| 2007/0204543 | A1 | | 9/2007 | Schattka et al. |
| 2007/0204544 | A1 | | 9/2007 | Kautz et al. |
| 2007/0208107 | A1 | | 9/2007 | Schattka et al. |
| 2007/0208109 | A1 | | 9/2007 | Kautz et al. |

(Continued)

FOREIGN PATENT DOCUMENTS

| DE | 27 22 752 A1 | 11/1978 |
|---|---|---|
| EP | 1 162 217 | 12/2001 |

(Continued)

OTHER PUBLICATIONS http://www.sigmaaldrich.com/img/assets/3900/Thermal_Transitions_of_Homopolymers.pdf, Aldrich, May 2003.*
U.S. Appl. No. 11/571,115, filed Dec. 21, 2006, Schattka, et al.
U.S. Appl. No. 10/574,175, filed Mar. 30, 2006, Loehden, et al.
U.S. Appl. No. 11/997,621, filed Feb. 1, 2008, Loehden, et al.
U.S. Appl. No. 60/975,574, filed Sep. 27, 2007, Kuppert, et al.
U.S. Appl. No. 12/441,664, filed Mar. 17, 2009, Schattla, et al.

(Continued)

*Primary Examiner* — Karuna P Reddy

(74) *Attorney, Agent, or Firm* — Westerman, Hattori, Daniels & Adrian, LLP

(57) ABSTRACT

The invention relates to pulverulent core/shell polymers for the preparation of a plastisol, which have surprisingly low water absorption. The invention further relates to the plastisol pastes which are prepared from these polymers and likewise have low water absorption and additionally possess good storage stability, good mechanical properties and good plasticizer compatibility. The core/shell polymers consist of latex particles having a primary particle size of at least 250 nm, the core consisting of methyl methacrylate, (meth)acrylic esters with $C_2$ to $C_8$ or aromatic alcohol radicals and optionally further monomers, and the shells(s) comprising, in addition to these components, also amides of (meth)acrylic acid and/or amine-substituted alkyl esters of (meth)acrylic acid.

13 Claims, No Drawings

(56) References Cited

U.S. PATENT DOCUMENTS

| | | |
|---|---|---|
| 2008/0057205 A1 | 3/2008 | Lohden et al. |
| 2008/0292893 A1 | 11/2008 | Loehden et al. |
| 2009/0048401 A1 | 2/2009 | Loehden et al. |
| 2009/0062508 A1 | 3/2009 | Balk et al. |
| 2009/0099271 A1 | 4/2009 | Einfeldt et al. |

FOREIGN PATENT DOCUMENTS

| | | |
|---|---|---|
| JP | 53-144950 | 12/1978 |
| JP | 2000-273262 | 10/2000 |

OTHER PUBLICATIONS

U.S. Appl. No. 12/301,903, filed Nov. 21, 2008, Balk, et al.
U.S. Appl. No. 12/373,732, filed Jan. 14, 2009, Balk, et al.
U.S. Appl. No. 12/304,275, filed Dec. 11, 2008, Balk, et al.
U.S. Appl. No. 12/373,892, filed Jan. 15, 2009, Balk, et al.
U.S. Appl. No. 12/373,531, filed Jan. 13, 2009, Schattka, et al.
U.S. Appl. No. 12/440,244, filed Mar. 6, 2009, Balk, et al.
U.S. Appl. No. 12/279,197, filed Oct. 21, 2008, Roos, et al.

* cited by examiner

LOW WATER-ABSORPTION PLASTISOL POLYMERS

The present invention relates to pulverulent core/shell polymers for the preparation of a plastisol, which have surprisingly low water absorption.

The inventor further relates to the plastisol pastes which are prepared from these polymers and likewise have low water absorption and additionally good storage stability, good mechanical properties and good plasticizer compatibility.

Dispersions of fine polymer powders in plasticizers, known as plastisols, are employed industrially on a large scale, usually with addition of further constituents such as fillers and pigments. Especially plastisols based on polyvinyl chloride (PVC) are employed on a relatively large scale for coating, for example for corrosion protection of metals, in particular underbody protection and chassis sealing of automobiles; other examples are coating of wallpapers or carpet backings.

Over a prolonged period, coatings and linings composed or polyvinyl chloride (PVC) have played a leading role on the market owing to their versatility and their good use properties, especially because the polymer particles are not swollen by the plasticizer nor dissolve in it during the storage of the plastisol pastes (storage stability), and because, after gelling of the plastisols by heating, the plasticizer is retained by the film formed and is not released from the film formed in the course of time ("sweating").

In recent times, there has been an emerging trend of replacement of PVC by other materials. Reasons for this include environmental aspects and the performance of the polymers in the event of fire. In addition to the release of halogen-containing fumes which can lead to serious injuries, these include in particular the adverse effects in relation to acid rain and the possibility of dioxin formation.

However, in all of these endeavours, it had to be considered that industry was not prepared to accept drastic cuts in the accustomed quality of PVC products in the case of replacement products for PVC polymers.

It has therefore been proposed to use polymers based on polyurethanes, epoxides silicones, etc. as replacements for the PVC polymers. However, these have the disadvantage that the existing production plants for polyvinyl chloride plastisols cannot be used and not inconsiderable capital costs would therefore arise in the case of use of these polymers. Furthermore, these replacement polymers have further disadvantages such as insufficient storage stability, toxicity or high production costs. It is therefore an object of the invention to discover suitable replacement products for vinyl chloride polymers.

For example, it has been proposed to replace vinyl chloride polymers at least partly by acrylic polymers (JP-A 60-258241, JP-A 61-185518 and JP-A 61-207418). However, this does not avoid the crucial disadvantage of preventing the release of toxic gases in the event of fire.

JP-A-5 25563 does disclose a halogen-free acrylic polymer, but the properties of the plastisols prepared therewith are highly unsatisfactory in relation to storage stability and retention capacity of the plasticizer.

It as therefore been attempted to prepare acrylic polymers which possess van der Waals cohesive forces which correspond roughly to those of PVC. However, it has been found in this context that high compatibility between polymer and plasticizer also leads to enhanced gelling, which means poor storage stability. However, lowering of the compatibility between polymer and plasticizer leads to them no longer being retained adequately in the film formed and migrating outwards in the course of time.

JP-A-5-279539 and EP-A-1 162 217 relate to core/shell polymers which are based on (meth)acrylates and contain carboxylic acid, carboxylic anhydride or sulphonic acid groups. However, these groups adversely affect both the compatibility with the plasticizer and the water absorption.

The same disadvantages are possessed by core/shell polymers which are prepared according to JP-A-6-322225 by converting the ester groups at the surface of latex particles at least partly to carboxylic acid groups in a polymer-like alkaline hydrolysis.

The Japanese applications JP-A-53144950, JP-A-7-233299 and JP-A-8-295850 disclose core/shell polymers in which core and shell possess polymers of different composition, each of these being optimized for certain properties, for example storage stability. However, the films formed therewith likewise have only unsatisfactory properties.

A general problem in the plastisols consists in the water absorption of the polymer powder or of the ungelled plastisol paste. In the course of gelling of the plastisol paste at temperatures of typically above 100° C., this water evaporates and leads to undesired bubble formation in the finished film.

In order to achieve acceptable mechanical properties and plasticizer compatibility of the finished plastisol film, high contents of methacrylates with relatively long alkyl chains (e.g. butyl methacrylate) are generally required. On the other hand, in order to achieve acceptable storage stability, acid-containing monomers have to be used in the shell. However, the latter bring about increased water absorption, worsen the resistance to mechanical stress (for example stone-chipping) and reduce the cold flexibility.

It is therefore an object of the invention to provide acrylic polymers which are based on (meth)acrylates, have core/shell structure, and have both good storage stability and good plasticizer retention capacity with simultaneously low water absorption. Moreover, the gelled plastisols should exhibit good attrition resistance against stone-chipping and have good cold flexibility.

These and further objects which are not specified explicitly but which can be derived or discerned directly from the connections discussed by way of introduction herein are achieved by core/shell polymers having the features of the invention. Appropriate modifications of the inventive core/shell polymers are protected, and plastisols prepared using the inventive polymers are protected. With regard to the process for the preparation and to the use, the invention affords a solution of the underlying object.

It was surprising that core/shell polymers have such a low water absorption of less than 3% when they have the inventive composition.

In particular, the inventive polymers have an advantageous combination of good storage stability, good plasticizer compatibility, good mechanical properties and low water absorption.

DETAILED DESCRIPTION OF THE INVENTION

The core/shell polymers of the present application consist of latex particles which possess a primary particle size of at least 250 nm, preferably of at least 500 nm and more preferably of at least 700 nm. In this context, primary particle size refers to the diameter of an individual, generally spherical and non-agglomerated polymer particle which is obtained as the product in the emulsion polymerization. Typically an average particle diameter is specified for this quantity, and can, for example, be determined by laser diffraction.

The latex particles of the present application consist of a core and at least one shell which are prepared successively in at least two separate steps. In general, the core and the shell(s) each have a different composition.

When the term "shell(s)" is used here, this is intended to mean that the statement in question can relate either to one shell or, if appropriate, to a plurality of shells present.

The first component of the core is methyl methacrylate. This component is present to an extent of at least 20 mol % and is a maximum of 85 mol %. The fraction of methyl methacrylate may also be 30 to 70 mol % or 40 to 60 mol %.

As a further component, the core of the latex particles comprises one or more (meth)acrylic esters whose alcohol component contains 2-8 carbon atoms or an aromatic radical.

In the context of this application, the notation (meth) acrylic ester or (meth)acrylate can mean either methacrylic ester and methacrylate, for example methyl methacrylate, ethyl methacrylate, etc., or acrylic ester and acrylate, for example methyl acrylate, ethyl acrylate, etc. or, if appropriate, a mixture of the two.

Examples of such esters are (meth)acrylates which derive from saturated alcohols, such as ethyl(meth)acrylate, n-propyl(meth)acrylate, isopropyl(meth)acrylate, n-butyl(meth) acrylate, i-butyl(meth)acrylate, tert-butyl(meth)acrylate, pentyl(meth)acrylate, hexyl(meth)acrylate and heptyl(meth) acrylate; ethylhexyl(meth)acrylate, octyl(meth)acrylate, isooctyl(meth)acrylate, cycloalkyl(meth)acrylates such as cyclopentyl(meth)acrylate and cyclohexyl(meth)acrylate; (meth)acrylates which derive from unsaturated alcohols such as 2-propynyl(meth)acrylate and allyl(meth)acrylate, vinyl (meth)acrylate;
aryl(meth)acrylates, such as benzyl methacrylate or phenyl methacrylate, where the aryl radicals may each be unsubstituted or up to tetrasubstituted.

In a particular embodiment, component b) of the core of the latex particles is either n-butyl(meth)acrylate, i-butyl(meth) acrylate or tert-butyl(meth)acrylate or a mixture thereof.

These esters may be present to an extent of 15-80 mol %, to an extent of 30-70 mol % or to an extent of 40-60 mol %.

As a further constituent, the cores of latex particles may contain 0-30 mol %, 0-20 mol %, 0-10 mol % or 0-5 mol % of one or more copolymerizable monomers. The presence of these monomers may be favourable in particular cases in order, where appropriate, to selectively establish certain properties of the core of the latex particles.

N-containing compounds are excluded. It has been found that, surprisingly, latex particles which contain no nitrogen-containing compounds in the core have improved cold flexibility. Possible compounds are all ethylenically unsaturated compounds which, under the given polymerization conditions, can be incorporated into the polymer which forms the core.

These include
glycol dimethacrylates such as 1,4-butanediol methacrylate, 2-butyloxyethyl methacrylate, 2-ethoxyethoxymethyl methacrylate, 2-ethoxyethyl methacrylate, methacrylates of ether alcohols such as tetrahydrofurfuryl methacrylate, vinyloxyethoxyethyl methacrylate, methoxyethoxyethyl methacrylate, 1-butoxypropyl methacrylate, 1-methyl-(2-vinyloxy) ethyl methacrylate, cyclohexyloxymethyl methacrylate, methoxymethoxyethyl methacrylate, benzyloxymethyl methacrylate, furfuryl methacrylate, 2-butoxyethyl methacrylate, 2-ethoxyethoxymethyl methacrylate, 2-ethoxyethyl methacrylate, allyloxymethyl methacrylate, 1-ethoxybutyl methacrylate, methoxymethyl methacrylate, 1-ethoxyethyl methacrylate, ethoxymethyl methacrylate;

oxiranyl methacrylates such as 2,3-epoxybutyl methacrylate, 3,4-epoxybutyl methacrylate, glycidyl methacrylate;
phosphorus-, boron- and/or silicon-containing methacrylates such as 2-(dimethylphosphato)propyl methacrylate, 2-(ethylenephosphito) propyl methacrylate, dimethylphosphinomethyl methacrylate, dimethylphosphonoethyl methacrylate, diethylmethacryloyl phosphorate, dipropylmethacryloyl phosphate;
sulphur-containing methacrylates such as ethylsulphinylethyl methacrylate, 4-thiocyanatobutyl methacrylate, ethylsulphonylethyl methacrylate, thiocyanatomethyl methacrylate, methylsulphinylmethyl methacrylate, bis (methacryloyloxyethyl) sulphide;
trimethacrylates such as trimethyloylpropane trimethacrylate;
vinyl esters such as vinyl acetate;
styrene, substituted styrenes having an alkyl substituent in the side chain, for example α-methylstyrene and α-ethylstyrene, substituted styrenes having an alkyl substituent on the ring, such as vinyltoluene and p-methylstyrene;
heterocyclic vinyl compounds such as 9-vinylcarbazole, 3-vinylcarbazole, 4-vinylcarbazole, vinyloxolane, vinylfuran, vinylthiophene, vinylthiolane, vinylthiazoles and hydrogenated vinylthiazoles, vinyloxazoles and hydrogenated vinyloxazoles;
vinyl and isoprenyl ethers;
maleic acid derivatives, for example diesters of maleic acid, in which the alcohol radicals have 1 to 9 carbon atoms, maleic anhydride, methylmaleic anhydride, fumaric acid derivatives, for example diesters of fumaric acid in which the alcohol radicals have 1 to 9 carbon atoms;
dienes, for example divinylbenzene
Alpha-olefins such as ethene, propene, n-butene, i-butene, n-pentene, i-pentene, n-hexene i-hexene.
Cyclohexene.

In a specific embodiment, the further copolymerizable monomers of the core may also include ethylenically unsaturated monomers having at least one carboxylic acid group, sulphonic acid group and/or at least one phosphonic acid group. These are all organic compounds which have both at least one ethylenic double bond and at least one carboxylic acid group, sulphonic acid group and/or at least one phosphonic acid group. They include, for example:
acrylic acid,
methacrylic acid,
1-[2-(isopropenylcarbonyloxy)ethyl]maleate (monoester of 2-hydroxyethyl methacrylate (HEMA) and maleic acid),
1-[2-(vinylcarbonyloxy)ethyl]maleate (monoester of 2-hydroxyethyl acrylate (HEA) and maleic acid),
1-[2-(isopropenylcarbonyloxy)ethyl]succinate (monoester of HEMA and succinic acid),
1-[2-(vinylcarbonyloxy)ethyl]succinate (monoester of HEA and succinic acid),
1-[2-(isopropenylcarbonyloxy)ethyl]phthalate (monoester of HEMA and phthalic acid),
1-[2-(vinylcarbonyloxy)ethyl]phthalate (monoester of HEA and phthalic acid),
1-[2-(isopropenylcarbonyloxy)ethyl]hexahydrophthalate (monoester of HEMA and hexahydrophthalic acid),
1-[2-(vinylcarbonyloxy)ethyl]hexahydrophthalate (monoester of HEA and hexahydrophthalic acid),
1-[2-(isopropenylcarbonyloxy)butyl]maleate (monoester of 2-hydroxybutylmethacrylate (HEMA) and maleic acid),
1-[2-(vinylcarbonyloxy)butyl]maleate (monoester of 2-hydroxybutylacrylate (HBA) and maleic acid),
1-[2-(isopropenylcarbonyloxy)butyl]succinate (monoester of HBMA and succinic acid), 1-[2-(vinylcarbonyloxy)butyl]succinate (monoester of HEA and succinic acid),
1-[2-(isopropenylcarbonyloxy)butyl]phthalate (monoester of HBMA and phthalic acid),
1-[2-(vinylcarbonyloxy)butyl]phthalate (monoester of HBA and phthalic acid),
1-[2-(isopropenylcarbonyloxy)butyl]hexahydrophthalate (monoester of HBMA and hexahydrophthalic acid),
1-[2-(vinylcarbonyloxy)butyl]hexahydrophthalate (monoester of HBA and hexahydrophthalic acid),
fumaric acid,
monoesters of fumaric acid;
maleic acid,
monoesters of maleic acid,
crotonic acid,
itaconic acid,
acrylamidoglycolic acid,
methacrylamidobenzoic acid,
cinnamic acid,
vinylacetic acid,
trichloroacrylic acid,
10-hydroxy-2-decanoic acid,
4-methacryloyloxyethyltrimethyl acid,
styrene carboxylic acid,
2-(isopropenylcarbonyloxy)ethanesulphonic acid,
2-(vinylcarbonyloxy)ethanesulphonic acid,
2-(isopropenylcarbonyloxy)propylsulphonic acid,
2-(vinylcarbonyloxy)propylsulphonic acid,
2-acrylamido-2-methylpropanesulphonic acid,
acrylamidododecanesulphonic acid,
2-propene-1-sulphonic acid,
methallylsulphonic acid,
styrenesulphonic acid,
styrenedisulphonic acid,
methacrylamidoethanephosphonic acid,
vinylphosphonic acid.

The aforementioned ethylenically unsaturated monomers may be used individually or as mixtures.

The molar fractions of the aforementioned components of the core of the latex particles may each be varied within the ranges mentioned, although it should always be noted that the sum of the selected fractions of components a), b) and c) together has to add up to 100 mol %.

As a further component, the latex particles comprise at least one shell which, in a second or optionally further reaction stage, are formed on the core. The coherence of core and shell and between the shells can be achieved by physical forces only or else by covalent bonds which have formed by grafting.

The first component of the shell(s) is methyl methacrylate. This component is always present to an extent of at least 20 mol % and is a maximum of 94.5 mol %. The proportion of methyl methacrylate may also be from 40 to 85 mol % or from 50 to 79.5 mol %.

As a further component the shell(s) of the latex particles comprise(s) one or more (meth)acrylic esters whose alcohol component contains 2-8 carbon atoms or an aromatic radical.

Examples of such esters are (meth)acrylates which derive from saturated alcohols, such as ethyl(meth)acrylate, n-propyl(meth)acrylate, isopropyl(meth)acrylate, n-butyl(meth)acrylate, i-butyl(meth)acrylate tert-butyl(meth)acrylate, pentyl(meth)acrylate, hexyl(meth)acrylate and heptyl(meth)acrylate; ethylhexyl(meth)acrylate, octyl(meth)acrylate, isooctyl(meth)acrylate, cycloalkyl(meth)acrylates such as cyclopentyl(meth)acrylate and cyclohexyl(meth)acrylate; (meth)acrylates which derive from unsaturated alcohols such as 2-propynyl(meth)acrylate and allyl(meth)acrylate, vinyl (meth)acrylate;
aryl(meth)acrylates, such as benzyl methacrylate or phenyl methacrylate, in which the aryl radicals may each be unsubstituted or up to tetrasubstituted.

These esters may be present to an extent of 5-79.9 mol %, to an extent of 10-50 mol % or to an extent of 15-40 mol %.

The third component of the shell(s) is either an amide of acrylic acid and/or of methacrylic acid, or of an amine-substituted alkyl ester of acrylic acid and/or of methacrylic acid, or a mixture of the above compounds.

Amides may be simple amides, i.e. acrylamide or methacrylamide, or N-substituted amides of acrylic acid and/or of methacrylic acid, which bear functional groups of the following formula

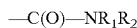

where $R_1$ and $R_2$ are each independently H or a linear or branched alkyl radical which has 1-10 carbon atoms and may optionally also additionally contain amino groups of the formula —$NR_3R_4$ where $R_3$ and $R_4$ are each independently H or a linear or branched alkyl radical having 1-10 carbon atoms, or the nitrogen together with the substituents $R_3$ and $R_4$ may also form a five- to seven-membered ring. The ring may optionally also be substituted by one or more short-chain alkyl groups, for example methyl, ethyl or propyl, or include heteroatoms such as nitrogen or oxygen.

Examples thereof are N-methyl(meth)acrylamide, N-dimethylaminoethyl(meth)acrylamide, N-dimethylaminopropyl(meth)acrylamide, N-isopropyl(meth)acrylamide, N-tert-butyl(meth)acrylamide, N-isobutyl(meth)acrylamide, N-decyl(meth)acrylamide, N-cyclohexyl(meth)acrylamide, N-1,3-(dimethylamino)-2,2-dimethylpropyl)methacrylamide, N-dodecyl(meth)acrylamide, N-[3-dimethylaminopropyl](meth)acrylamide, N-[2-hydroxyethyl](meth)acrylamide, N-methacryloylmorpholine, N-methacryloyl-2-pyrrolidinone.

Particular preference is given to acrylamide and methacrylamide.

The aforementioned amides of acrylic acid and/or of methacrylic acid are a constituent to an extent of 0.1-20 mol % of one shell or optionally of a plurality of shells of the latex particle. Preferred fractions are 0.3-10 mol % or 1-5 mol %, these data being based on the particular shells and the fractions in different shells possibly being different.

Amine-substituted alkyl esters of acrylic acid and/or of methacrylic acid bear the following functional groups

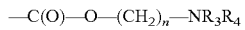

where n=1 to 6
and $R_3$ and $R_4$ are each independently H or a linear or branched alkyl radical having 1-10 carbon atoms, or the nitrogen together with the substituents $R_3$ and $R_4$ may also form a five- to seven-membered ring. The ring may optionally also be substituted by one or more short-chain alkyl groups, for example methyl, ethyl or propyl, or include heteroatoms such as nitrogen or oxygen.

Examples thereof are: 2-dimethylaminoethyl(meth)acrylate, 2-diethylaminoethyl(meth)acrylate, 3-dimethylamino-2,2-dimethylprop-1-yl(meth)acrylate, 3-diethylamino-2,2-dimethylprop-1-yl(meth)acrylate, 2-tert-butylaminoethyl (meth)acrylate, 3-(dimethylamino)propyl(meth)acrylate, 2-(dimethylaminoethoxyethyl)(meth)acrylate, 2-morpholinoethyl(meth)acrylate, N-(2-methacryloyloxyethyl)-2-pyrrolidinone, N-(3-methacryloyloxypropyl)-2-pyrrolidinone, N-(2-methacryloyloxypentadecyl)-2-pyrrolidinone, N-(3-methacryloyloxyheptadecyl)-2-pyrrolidinone.

The aforementioned amine-substituted alkyl esters of acrylic acid and/or of methacrylic acid are constituents to an extent of 0.1-20 mol % of one shell or optionally of a plurality of shells of the latex particle. Preferred fractions are 0.5-10 mol % or 1-5 mol-%, these data being based or the particular shells and the fractions in different shells possibly being different.

The aforementioned amides of acrylic acid and/or of methacrylic acid, or amine-substituted alkyl esters of acrylic acid and/or of methacrylic acid, may optionally also be present alongside one another in one or more shells of the latex particles. In this case, the combined fraction of the compounds is 0.1-20 mol %. Preferred fractions are 0.5-10 mole or 1-5 mol % these data being based on the particular shells and the fractions in different shells possibly being different.

As a further constituent, the shells of the latex particles may contain 0-30 mol %, 0-20 mol %, 0-10 mol % or 0-5 mol % of one or more copolymerizable monomers. The presence of these monomers may be favourable in particular cases in order, where appropriate, to selectively establish certain properties of the shell of the latex particles. Possible compounds are all vinylically unsaturated compounds which can be incorporated into the polymer which forms the particular shell under the given polymerization conditions.

These include
nitrites of (meth)acrylic acid and other nitrogen-containing methacrylates, such as methacryloylamidoacetonitrile, 2-methacryloyloxyethylmethylcyanamide, cyanomethyl methacrylate;
carbonyl-containing methacrylates such as oxazolidinylethyl methacrylate, N-(methacryloyloxy)formamide, acetonyl methacrylate, N-methacryloylmorpholine, N-methacryloyl-2-pyrrolidinone;
glycol dimethacrylates such as 1,4-butanediol methacrylate, 2-butoxyethyl methacrylate, 2-ethoxyethoxymethyl methacrylate, 2-ethoxyethyl methacrylate, methacrylates of ether alcohols, such as tetrahydrofurfuryl methacrylate, vinyloxyethoxyethyl methacrylate, methoxyethoxyethyl methacrylate, 1-butoxypropyl methacrylate, 1-methyl-(2-vinyloxy)ethyl methacrylate, cyclohexyloxymethyl methacrylate, methoxymethoxyethyl methacrylate, benzyloxy ethyl methacrylate, furfuryl methacrylate, 2-butoxyethyl methacrylate, 2-ethoxyethoxymethyl methacrylate, 2-ethoxyethyl methacrylate, allyloxymethyl methacrylate, 1-ethoxybutyl methacrylate, methoxymethyl methacrylate, 1-ethoxyethyl methacrylate, ethoxymethyl methacrylate;
oxiranyl methacrylates such as 2,3-epoxybutyl methacrylate, 3,4-epoxybutyl methacrylate, glycidyl methacrylate;
phosphorus-, boron- and/or silicon-containing methacrylates such as 2-(dimethylphosphato)propyl methacrylate, 2-(ethylenephosphito)propyl methacrylate, dimethylphosphinomethyl methacrylate, dimethylphosphonoethyl methacrylate, diethylmethacryloyl phosphonate, dipropylmethacryloyl phosphate;
sulphur-containing methacrylates such as ethylsulphinylethyl methacrylate, 4-thiocyanatobutyl methacrylate, ethylsulphonylethyl methacrylate, thiocyanatomethyl methacrylate, methylsulphinylmethyl methacrylate, bis(methacryloyloxyethyl) sulphide;
trimethacrylates such as trimethyloylpropane trimethacrylate;
vinyl esters such as vinyl acetate;
styrene, substituted styrenes having an alkyl substituent in the side chain, for example α-methylstyrene and α-ethylstyrene, substituted styrenes having an alkyl substituent on the ring, such as vinyltoluene and p-methylstyrene;
heterocyclic vinyl compounds such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles and hydrogenated vinylthiazoles, vinyloxazoles and hydrogenated vinyloxazoles;
vinyl and isoprenyl ethers;
maleic acid derivatives, for example diesters of maleic acid, in which the alcohol radicals have 1 to 9 carbon atoms, maleic anhydride, methylmaleic anhydride, maleimide, methylmaleimide;
fumaric acid derivatives, for example diesters of fumaric acid, in which the alcohol radicals have 1 to 9 carbon atoms;
dienes, for example divinylbenzene.

Alpha-olefins such as ethene, propene, n-butene, i-butene, n-pentene, i-pentene, n-hexene, i-hexene.

Cyclohexene.

The aforementioned ethylenically unsaturated monomers may be used individually or as mixtures.

In a specific a embodiment, the further copolymerizable monomers of the shell(s) may also include ethylenically unsaturated monomers having at least one carboxylic acid group, sulphonic acid group and/or at least one phosphonic acid group. These are all organic compounds which have both at least one ethylenic double bond and at least one carboxylic acid group, sulphonic acid group and/or at least one phosphonic acid group. They include, for example:
acrylic acid,
methacrylic acid,
1-[2-(isopropenylcarbonyloxy)]ethyl maleate (monoester of 2-hydroxyethyl methacrylate (HEMA) and maleic acid),
1-[2-(vinylcarbonyloxy)ethyl]maleate (monoester of 2-hydroxyethyl acrylate (HEA) and maleic acid),
1-[2-(isopropenylcarbonyloxy)ethyl]succinate (monoester of HEMA and succinic acid),
1-[2-(vinylcarbonyloxy)ethyl]succinate (monoester of HEA and succinic acid),
1-[2-(isopropenylcarbonyloxy)ethyl]phthalate (monoester of HEMA and phthalic acid),
1-[2-(vinylcarbonyloxy)ethyl]phthalate (monoester of HEA and phthalic acid),
1-[2-(isopropenylcarbonyloxy)ethyl]hexahydrophthalate (monoester of HEMA and hexahydrophthalic acid),
1-[2-(vinylcarbonyloxy)ethyl]hexahydrophthalate (monoester of HEA and hexahydrophthalic acid),
1-[2-(isopropenylcarbonyloxy)butyl]maleate (monoester of 2-hydroxybutylmethacrylate (HBMA) and maleic acid),
1-[2-(vinylcarbonyloxy)butyl]maleate (monoester of 2-hydroxybutylacrylate (HBA) and maleic acid),
1-[2-(isopropenylcarbonyloxy)butyl]succinate (monoester of HBMA and succinic acid),
1-[2-(vinylcarbonyloxy)butyl]succinate (monoester of HBA and succinic acid),
1-[2-(isopropenylcarbonyloxy)butyl]phthalate (monoester of HBMA and phthalic acid),
1-[2-(vinylcarbonyloxy)butyl]phthalate (monoester of HBA and phthalic acid),
1-[2-(isopropenylcarbonyloxy)butyl]hexahydrophthalate (monoester of HBMA and hexahydrophthalic acid),
1-[2-(vinylcarbonyloxy)butyl]hexahydrophthalate (monoester of HBA and hexahydrophthalic acid), fumaric acid,
monoesters of fumaric acid,
maleic acid,
monoesters of maleic acid,
crotonic acid,
itaconic acid,
acrylamidoglycolic acid,
methacrylamidobenzoic acid,
cinnamic acid,
vinylacetic acid,
trichloroacrylic acid,
10-hydroxy-2-decanoic acid,
4-methacryloyloxyethyltrimethyl acid,
styrene carboxylic acid,
2-(isopropenylcarbonyloxy)ethanesulphonic acid,
2-(vinylcarbonyloxy)ethanesulphonic acids
2-(isopropenylcarbonyloxy)propylsulphonic acid,
2-(vinylcarbonyloxy)propylsulphonic acid,
2-acrylamido-2-methylpropanesulphonic acids,
acrylamidododecanesulphonic acid,
2-propene-1-sulphonic acid,
methallylsulphonic acid,
styrenesulphonic acid,
styrenedisulphonic acid,
methacrylamidoethanephosphonic acid,
vinylphosphonic acid.

However, these ethylenically unsaturated monomers having at least one carboxylic acid group, sulphonic acid group and/or at least one phosphonic acid group are present in less than 0.5 mol %, preferably less than 0.4 mol % and more preferably less than 0.3 mol %. Owing to the high polarity of these functional groups, higher fractions of the aforementioned monomers are damaging for the low water absorption according to the invention and are therefore avoided.

In one embodiment, component d') of at least one shell the core/shell polymer consists of less than 0.5 mol % of a monomer having a carboxyl group or a sulphonic acid group or a phosphonic group, and optionally further copolymerizable monomers.

The molar fractions of the aforementioned components of the particular shell(s) of the latex particles may each be varied within the ranges specified, although it should always be noted that the sum of the selected fractions of components a'), b'), c') and d') within one shell has to add up to 100 mol %.

In a particular embodiment, the core/shell polymer consists of a core and a shell. The weight ratio of core to shell can be varied within wide limits and is between 10:90 and 90:10. This weight ratio arises from the weight of the monomers.

Further embodiments may be core/shell polymers which consist of a core and two or more shells. The number of shells is 2 or 3 in most cases, but may also be higher. The chemical composition of individual shells or all shells may be the same or else may optionally have different monomer compositions.

A further preferred embodiment is characterized in that both component b) of the core and component b') of at least one shell is n-butyl(meth)acrylate, i-butyl(meth)acrylate or t-butyl(meth)acrylate or a mixture thereof.

In a further advantageous embodiment, the core/shell polymers contain, in at least one shell, less than 0.5 mol %, preferably less than 0.4 mol % and more preferably less than 0.3 mol %, of a monomer having a carboxyl group or a sulphonic acid group or a phosphonic acid group.

Owing to the high polarity of these functional groups, higher fractions of the aforementioned monomers are damaging for the low water absorption according to the invention and are therefore avoided. However, the shell(s) may optionally contain further copolymerizable monomers until the upper limit already specified has been attained.

It is possible to prepare from the inventive polymers plastisols which comprise the core/shell polymers and at least one plasticizer. In many cases, the use of a single plasticizer is sufficient, but it may also be advantageous to use a mixture of two or more different plasticizers.

As plasticizers, particular mention may be made of the phthalates, for example diisodecyl phthalate, diethylhexyl phthalate, diisononyl phthalate, di-C7-C11-n-alkyl phthalate, dioctyl phthalate, tricresyl phosphate, dibenzyltoluene and benzyl octyl phthalate. In addition, other compounds such as citrates, phosphates and benzoates may also be used.

The plasticizers mentioned may also be used as mixtures.

The quantitative ratios in plastisol pastes may vary within wide ranges. Typical formulations contain the plasticizers in fractions of 50 to 300 parts by weight for 100 parts of the core/shell polymer. For adjustment to the rheological demands, in particular in the processing of the plastisols, it is additionally possible to use solvents (for example hydrocarbons) as diluents.

In addition, the plastisols commonly also comprise inorganic fillers in amounts of 0-300 parts by weight. Examples include calcium carbonate (chalk), titanium dioxide, calcium oxide, precipitated and coated chalks as rheologically active additives, and also optionally thixotropic agents, for example pyrogenic silica.

Often, adhesion promoters are also added to the plastisol in amounts of 40-120 parts by weight; for example, polyamino amides or blocked isocyanates are used.

Self-crosslinking blocked isocyanates are described as particularly effective adhesion promoters in application in the field of poly(meth)acrylate plastisols, for example, in EP 1371674.

For the purposes of the application, the plastisols may comprise further constituents (assistants) customary for plastisols, such as wetting agents, stabilizers, levelling agents, pigments, blowing agents.

Mention may be made, for example, of calcium stearate as a levelling agent.

In principle, the mixing of the components for the inventive plastisols may be undertaken with different types of mixers. However, in accordance with experience with PVC and poly (meth)acrylate plastisols, preference is given to slow-running planetary stirrers, high-speed mixers or dissolvers, horizontal turbomixers and three-roll mills; the selection is influenced by the viscosity of the plastisols obtained.

The plastisol mass can typically be gelled in layer thicknesses of 0.05-5 mm at temperatures of 100-220° C. (preferably 120-160° C.) within less than 30 minutes.

The currently preferred modes of application for the coating of metal parts are spray processes, for example pastespraying processes. In these processes, the plastisol is commonly processed through airless spray guns at high pressures (approx. 300-400 bar).

In the particularly important automobile production/underbody protection application sector, the procedure is commonly to apply the plastisol after the electrocoating of the chassis and completion of drying. The thermal curing commonly takes place in an oven (for example forced-air oven) at customary residence times, depending on the temperature, in the range of 10-30 minutes, and temperatures between 100 and 200° C., preferably 120-160° C.

The cataphoretic coating of metallic substrates has been described many times (cf. DE-A 27 51 498, DE-A 27 53 861, DE-A 27 32 736, DE-A 27 33 188, DE-A 28 33 786).

The present core/shell polymers are characterized in that their water absorption is less than 3.0%. In, particular embodiments, the core/shell polymers may even have a water absorption of less than 2.0%, less than 1.5% or less than 1.0%. In a particularly preferred embodiment, the water absorption of the core/shell polymers is less than 0.8% or less than 0.5%.

The water absorption is determined by a method described within the present disclosure, in which the appropriate polymer samples are dried and stored under defined standard climatic conditions. The water absorption is determined by difference weighing in the manner described.

The plastisol pastes prepared using the inventive core/shell polymers likewise have a low water absorption.

A low water absorption of polymer powder or plastisol paste constitutes a considerable processing advantage since no impairments of film quality occur as a result of bubble formation when the powder or the paste is exposed to moist air, for example, in the course of storage or processing.

The process for preparing the plastisols based on a core/shell polymer is characterized in that
  a) the core/shell polymer is prepared by emulsion polymerization which may be multistage,
  b) the resulting dispersion is dried and
  c) subsequently admixed with at least one plasticizer and optionally with adhesion promoters and/or fillers and optionally further constituents customary for plastisols.

Suitable mixing ratios are 100 molar parts of core/shell polymer with 50-300 molar parts of plasticizers, 40-120 molar parts of adhesion promoters and/or 0-300 molar parts of fillers.

The core/shell polymers can be prepared by emulsion polymerization. This method is known to those skilled in the art and described comprehensively in standard works.

The core-shell polymers can be prepared in a manner known per se, preferably by emulsion polymerization which may optionally be performed in multiple stages. When emulsion polymerization is employed, it is advantageously possible to work by the emulsion or monomer feed process, in which a portion of the water and the entirety or fractions of the initiator and of the emulsifier are initially charged. In these processes, the particle size can advantageously be controlled by the amount of emulsifier initially charged. The emulsifiers used are in particular anionic and nonionic surfactants. In general, the amount of emulsifiers based on the polymer, will not exceed 2.5% by weight.

In addition to the compounds customary in emulsion polymerization, for example percompounds such as hydrogen peroxide, ammonium peroxydisulphate (APS), the initiators used may also be redox systems such as sodium disulphite-APS-iron and water-soluble azo initiators. The amount of initiator is generally from 0.005 to 0.5% by weight based on the polymer.

Within certain limits, the polymerization temperature depends upon the initiators. Thus, when APS is used, the working temperature is advantageously in the range of 60-90° C. When redox systems are used, it is also possible to polymerize at lower temperatures, for example at 30° C. In addition to feed polymerization, it is also possible to work by the process of batch polymerization. In this process, the entirety or a fraction of the monomers is initially charged with all assistants and the polymerization is initiated. The monomer-water ratio has to be adjusted to the heat of reaction released. In general, no difficulties occur when a 50% emulsion is generated in such a way that initially half of the monomers and of the assistants are emulsified in the entirety of the water and then the polymerization is initiated at room temperature, and, on completion of the reaction, the batch is cooled and the remaining half of the monomers is added together with the assistants.

The primary particles obtained from this process typically have an average particle size of from 250 to 1000 nm, which can be determined, for example, by laser diffraction.

The binders can be obtained in solid form in a conventional manner by freeze-drying, precipitation or preferably spray-drying.

The dispersions can be spray-dried in a known manner. On the industrial scale, what are known as spray towers are used, which are typically flowed through from top to bottom with hot air in cocurrent with the sprayed dispersion. The dispersion is sprayed through one or many nozzles or preferably atomized by means of a fast-rotating perforated disc. The entering hot air has a temperature of from 100 to 250° C., preferably of 150-250° C. For the properties of the spray-dried emulsion polymer, the exit temperature of the air is crucial, i.e. the temperature at which the dried powder particles are separated from the air stream at the foot of the spray tower or in a cyclone separator. If at all possible this temperature should be below the temperature at which the emulsion polymer would sinter or melt. In many cases, an exit temperature of 50-90° C. is very suitable.

With a constant air stream, the exit temperature can be regulated by variation of the amount of dispersion sprayed in continuously per unit time.

This usually results in the formation of secondary particles which consist of agglomerated primary particles. Under some circumstances, it may be advantageous that the individual latex particles adhere to one another in the course of drying to give larger units (partial vitrification). As a guideline value for the average particle sizes of the agglomerated units (measured, for example, with the method of laser diffraction), 5-250 μm can be assumed.

The plastisols prepared in accordance with the invention are suitable in particular for use as underbody protection and for seam sealing, in particular in automobile construction.

A further advantageous field of use of the inventive products is the coating of components (for example chassis constituents) for acoustic sound-deadening.

Furthermore, numerous other applications are possible, in particular those in which plastisols based on PVC have already been used previously.

Determination Methods:

Determination of the Water Absorption of the Polymer Powder:

The assessment of water absorption was based on the standard DIN EN ISO 62 for the determination of water absorption.

To this end, the polymer powder was dried at 60° C. in a vacuum drying cabinet until the drying loss (measured with a Mettler halogen drier HR73) was below 0.1%.

A sample of about 25 g of polymer powder was then weighed exactly onto a watch glass (diameter Ø=120 mm) (balance imprecision at most 0.1 mg). This sample was stored under 23/50 standard climatic conditions (DIN EN ISO 291) for 7 days.

After this storage, the weight increase of the polymer was determined by weighing the polymer and calculated by the formula $$\text{weight increase in \%} = \frac{\text{final weight} - \text{starting weight}}{\text{starting weight}} \times 100$$

Determination of the Water Absorption of the Plastisol Paste:

For the assessment of water absorption, the plastisol paste was prepared in a dissolver analogously to the process laid down in DIN 11468 for polyvinyl chloride pastes.

The following components were used:
100 parts by weight of binder (core/shell polymer)
100 parts by weight of plasticizer (diisononyl phthalate)

The plastisol paste was applied with a knife coater to a surface of 80 mm×80 mm with a thickness of 2 mm to a thin metal plate (thickness approx. 1 mm).

This metal plate was stored at 30° C. in an atmosphere having 80% relative atmospheric humidity for 10 days. Subsequently, the plastisol was gelled in an oven at 150° C. at over 60 minutes. The water absorption was assessed qualitatively with the aid of optical assessment of the film surface; high water absorption was exhibited in unevenness and bubbles, while good samples had a smooth fault-free surface.

Determination of Cold Flexibility

The cold flexibility was assessed based on DIN 53152 ("Mandrel flex test on paints and similar coatings."). First (analogously to the process laid down in DIN 11468 for polyvinyl chloride pastes), a plastisol paste consisting of equal parts by weight of binder and plasticizer (diisononyl phthalate) is prepared in a dissolver.

This is applied in a thickness of 2 mm to a metal plate treated with Teflon spray and gelled at 150° C. in an electrical oven for 60 minutes.

After the cooling, the film is raised off the substrate and stored at 25° C. for at least 12 hours.

Subsequently, the film is bent over a 12 mm-thick mandrel.

A plastisol film having very good cold flexibility sustains this treatment without visible damage.

In the case of films with somewhat poorer cold flexibility, whitening is observed which may still be reversible.

In the case of plastisol films having poor cold flexibility, fine cracks or even fracture of the material are observed.

Determination of Attrition Resistance

The attrition resistance is an excellent quality criterion for plastisols. A frequently used test method is described in EP 1371674. The chipping resistance test described there is based on a method in which the coating to be examined is applied at a defined layer thickness to a support (usually a sheet). Screw nuts are then allowed to fall onto the coating at a defined angle from a defined height. The amount of screw nuts that the coating survives before the underlying material appears is used as a measurement of the attrition resistance. High values correspond to good attrition resistances.

Determination of Storage Stability

The measure used for the storage stability is the rise in the viscosity of a plastisol paste over a defined period in the course of defined storage.

Analogously to the process described in DIN 11468, a plastisol paste is prepared from equal parts of plasticizer and binder. The viscosity $V_1$ of the freshly prepared plastisol is measured; subsequently, the paste is stored in a closed vessel at 35° C. for 7 days.

The viscosity $V_E$ of the stored paste is then measured. The rise in the viscosity in percent is calculated by the formula:

$$(V_E - V_I)/(V_I) \times 100$$

Example 1

A 5 liter reactor heatable by means of a waterbath and having a stirrer, reflux condenser, thermometer and metering pump is initially charged under a nitrogen atmosphere with 1100 g of water. The water is preheated with stirring to 74° C.-76° C.

For initiation, 30 ml of a 5% aqueous solution of sodium peroxodisulphate and 30 ml of a 5% aqueous solution of sodium hydrogensulphite are added.

Subsequently in the course of one hour, a monomer emulsion consisting of 500 g of methyl methacrylate, 250 g of isobutyl methacrylate and 250 g of n-butyl methacrylate, and also 8 g of bis-2-ethylhexyl sulphosuccinate (sodium salt) and 450 ml of deionized water are added dropwise.

On completion of the metered addition the mixture is stirred for 30 min and a further 15 ml of a 5% aqueous solution of sodium peroxodisulphate and 15 ml of a 5% aqueous solution of sodium hydrogensulphite are subsequently added.

A second monomer solution consisting of 700 g of methyl methacrylate, 130 g of isobutyl methacrylate, 130 g of n-butyl methacrylate, 40 g of methacrylamide and 8 g of bis-2-ethylhexyl sulphosuccinate (sodium salt) and 450 ml deionized water are metered in within one hour. A rise in the reaction temperature above 80° C. is prevented by means of waterbath cooling.

After addition of the emulsion, the temperature is kept between 75° C. and 80° C. during a post-reaction time of 30 min, before the resulting dispersion is cooled to room temperature.

In a drying tower with centrifugal atomizer, the polymer dispersion is converted to a powder. The tower exit temperature is 80° C.; the rotational speed of the atomizer disc is 20 000 min$^{-1}$.

Comparative Example 2

The procedure is analogous to Example 1 with the difference that a further 40 g of methyl methacrylate are used instead of 40 g of methacrylamide.

Comparative Example 3

The procedure is analogous to Example 1, with the difference that 40 g of methacrylic acid are used instead of 40 g of methacrylamide.

Assessment of Storage Stability

The pastes composed of the binders according to Example 1 and Comparative Example 3 have good storage stability. The rise in the viscosity within the experimental period is less than 10%.

The binder according to Comparative Example 2 has very poor storage stability. The viscosity rises within 7 days to more than double the value.

Assessment of Water Absorption

The binder powder according to Claim 1 has a water absorption of 0.92% by the above-described method.

After gelling, the paste gives rise to a smooth, fault-free film without bubbles.

The water absorption of Comparative Example 3 comprising methacrylic acid is distinctly higher.

Assessment of Cold Flexibility

The best cold flexibility is possessed by Comparative Example 2 which comprises no stabilizing monomers in the shell; in the mandrel flex test, this film does not exhibit any visible damage.

The cold flexibility of the inventive plastisol comprising the binder according to Claim 1 has a poorer but entirely acceptable cold flexibility: merely slight, reversible whitening can be observed.

The plastisol composed of the binder according to Comparative Example 3 has poor cold flexibility: in the mandrel flex test, distinct fracture formation is observed.

Assessment of Attrition Resistance

In the comparison of the plastisols prepared from the binders according to Example 1 and Comparative Example the inventive plastisol film exhibits 12% higher attrition resistance.

Summary of the Examples

It can be seen from the storage stability that a stabilizing monomer has to be present in the shell; this function is fulfilled both by methacrylic acid and by methacrylamide. The binder according to Comparative Example 2 does not fulfil this requirement.

While methacrylic acid, however, exerts an adverse influence on water absorption, attrition resistance and cold flexibility, this influence is considerably weaker in the case of methacrylamide.

The invention claimed is:

1. A core/shell polymer consisting of:
   latex particles having a primary particle size of at least 250 nm,
   the core consisting of
   a) 20-85 mol % of methyl methacrylate,
   b) 15-80 mol % of (meth)acrylic ester whose alcohol component contains 2-8 carbon atoms or an aromatic radical, and
   c) 0-30 mol % of further copolymerizable monomers, excluding N-containing compounds,
   wherein a), b) and c) together add up to 100 mol %, and
   at least one shell consisting in each case of
   a') 20-79.5 mol % of methyl methacrylate,
   b') 15-79.9 mol % of (meth)acrylic ester whose alcohol component contains 3-8 carbon atoms or an aromatic radical,
   c') 0.3-10 mol % of a compound selected from the group consisting of acrylamide, methacrylamide, N-methyl(meth)acrylamide, N-dimethylaminoethyl(meth)acrylamide, N-dimethylaminopropyl(meth)acrylamide, N-isopropyl(meth)acrylamide, N-tert-butyl(meth)acrylamide, N-isobutyl(meth)acrylamide, N-decyl(meth)acrylamide, N-cyclohexyl(meth)acrylamide, N-1,3-(dimethylamino)-2,2-dimethylpropyl)methacrylamide, N-dodecyl(meth)acrylamide, N-[3-dimethylaminopropyl](meth)acrylamide, N-methacryloylmorpholine, N-methacryloyl-2-pyrrolidinone and mixtures thereof, and
   d') 0-30 mol % of further copolymerizable monomers, wherein
   a'), b'), c') and d') of one shell in each case add up to 100 mol %, and
   component d') of at least one shell consists of less than 0.5 mol % of a monomer having a carboxyl group or a sulphonic acid group or a phosphonic group and optionally further copolymerizable monomers.

2. The core/shell polymer according to claim 1, wherein the latex particles consist of a core and a shell in a weight ratio of core to shell between 10:90 and 90:10.

3. The core/shell polymer according to claim 1, wherein the core has two shells having identical or different monomer compositions.

4. The core/shell polymer according to claim 1, wherein component b) of the core is n-butyl(meth)acrylate, i-butyl(meth)acrylate, t-butyl(meth)acrylate or a mixture thereof.

5. The core/shell polymer according to claim 1, wherein both component b) of the core and component b') of at least one shell is n-butyl(meth)acrylate, i-butyl(meth)acrylate, t-butyl(meth)acrylate or a mixture thereof.

6. The core/shell polymer according to claim 1, wherein the water absorption of the polymer is less than 3.0%.

7. A plastisol comprising a core/shell polymer according to claim 1 and at least one plasticizer.

8. The plastisol according to claim 7, wherein at least one of the plasticizers is a dialkyl phthalate.

9. A process for preparing a plastisol comprising a core/shell polymer according to claim 1, wherein
   a) the core/shell polymer is prepared by emulsion polymerization which may be multistage, to obtain a dispersion,
   b) the dispersion is dried, and
   c) subsequently admixed with at least one plasticizer and optionally with adhesion promoters and/or fillers and optionally further constituents customary for plastisols.

10. The process according to claim 9, comprising admixing 100 parts by weight of the core/shell polymer with
    50-300 parts by weight of a plasticizer, 40-120 parts by weight of an adhesion promoter and/or 0-300 parts by weight of fillers.

11. The process according to claim 9, wherein the dispersion is dried by spray-drying.

12. A method of protecting or sealing an article, comprising:
    contacting said article with the plastisol of claim 7.

13. The core/shell polymer according to claim 1, wherein the water absorption of the polymer is less than 2.0%.

* * * * *

UNITED STATES PATENT AND TRADEMARK OFFICE
CERTIFICATE OF CORRECTION

PATENT NO. : 8,933,169 B2  
APPLICATION NO. : 11/569699  
DATED : January 13, 2015  
INVENTOR(S) : Jan Schattka et al.

Page 1 of 1

It is certified that error appears in the above-identified patent and that said Letters Patent is hereby corrected as shown below:

ON THE TITLE PAGE:

At item (73), Assignee, change:

"(73) Assignee: Kaneka Belguim"

To be

-- (73) Assignee: Kaneka Belgium --.

Signed and Sealed this
Thirtieth Day of June, 2015

Michelle K. Lee
*Director of the United States Patent and Trademark Office*